United States Patent [19]

Thill

[11] 4,245,597

[45] Jan. 20, 1981

[54] SPLIT CYCLE HEAT ENGINES

[76] Inventor: Ernest M. Thill, 45 Hocking Ave., Earlwood, N.S.W. 2206, Australia

[21] Appl. No.: 947,645

[22] Filed: Oct. 2, 1978

[30] Foreign Application Priority Data

Oct. 20, 1977 [AU] Australia ............................ 2138/77

[51] Int. Cl.³ ............................................. F02B 53/00
[52] U.S. Cl. ...................................... 123/204; 418/99
[58] Field of Search ...................... 60/39.66; 123/204; 415/115, 175, 176; 416/92, 97 R; 418/91, 94, 97, 99

[56] References Cited

U.S. PATENT DOCUMENTS

| | | | |
|---|---|---|---|
| 2,799,253 | 7/1957 | Lindhagen et al. | 418/99 X |
| 2,891,382 | 6/1959 | Broffitt | 416/97 X |
| 3,405,604 | 10/1968 | Lysholm | 418/99 X |
| 3,752,606 | 8/1973 | Zimmern | 418/97 |

FOREIGN PATENT DOCUMENTS

| | | | |
|---|---|---|---|
| 487536 | 9/1975 | Australia | 418/195 |
| 1149941 | 6/1963 | Fed. Rep. of Germany | 418/97 |

Primary Examiner—Michael Koczo
Attorney, Agent, or Firm—Beveridge, DeGrandi, Kline & Lunsford

[57] ABSTRACT

In a split cycle combustion or heat engine having motor or transfer unit, or both, of positive displacement, such unit or units comprising workroom, housing and working parts of shaft, rotor, vane or vanes and interceptor, a method of sealing the working clearances or potential leak areas between the working parts, and the working parts and housing, and/or cooling the working parts and housing of any unit by providing a system of galleries or passages to and in the working parts and housing walls, these galleries capable of receiving compressed air or gas from a compressor via a booster pump and permitting such air or gas to flow into the workroom, or work chamber.

The booster pump so arranged that it is capable of delivering air or gas as sealing medium, or cooling medium with a higher pressure than the combustion pressure, or the pressure in any other unit of the engine.

The hereinbefore mentioned system of galleries or passages capable of receiving water injection to enhance the cooling effect of the cooling medium, and the heat energy so absorbed by the cooling medium capable of being recycled through said medium flowing into the workroom.

The cooling and sealing medium sealing the workroom or the combustion area by flowing from said galleries or passages through suitable nozzles across any working clearances between the working parts, and working parts and housing, and into the workroom, thereby inhibiting or preventing the working fluid within the workroom or within the combustion area from leaking out of these areas through any such working clearances.

7 Claims, 5 Drawing Figures

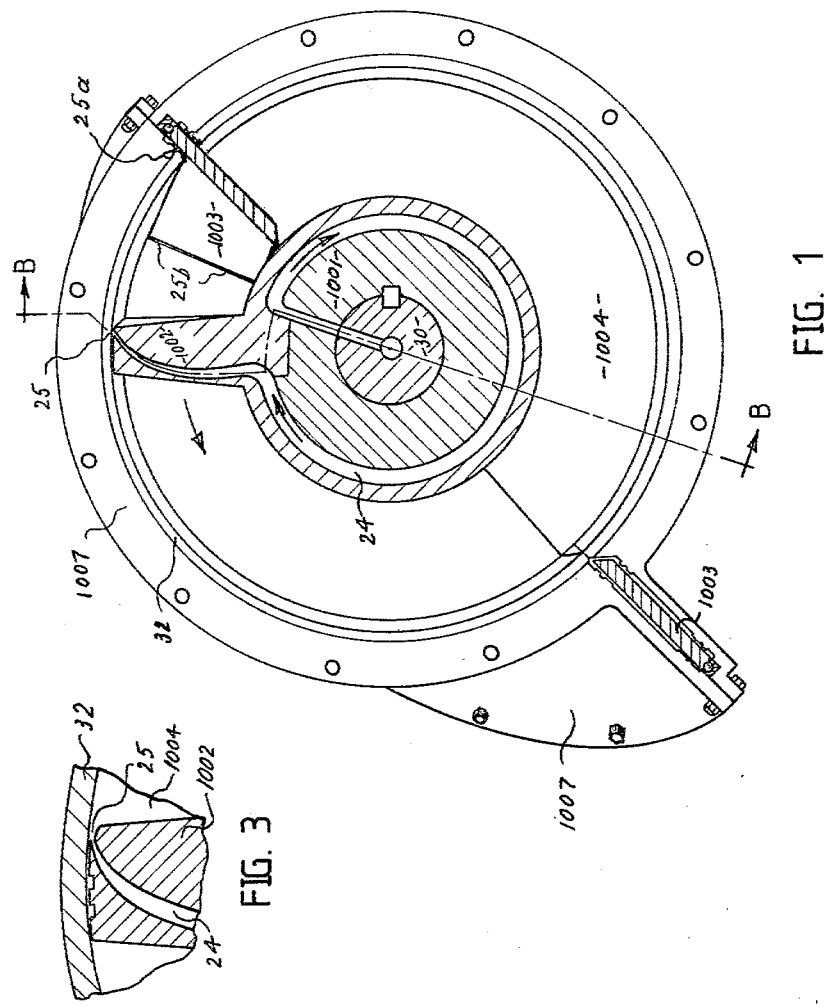
FIG. 1
FIG. 3
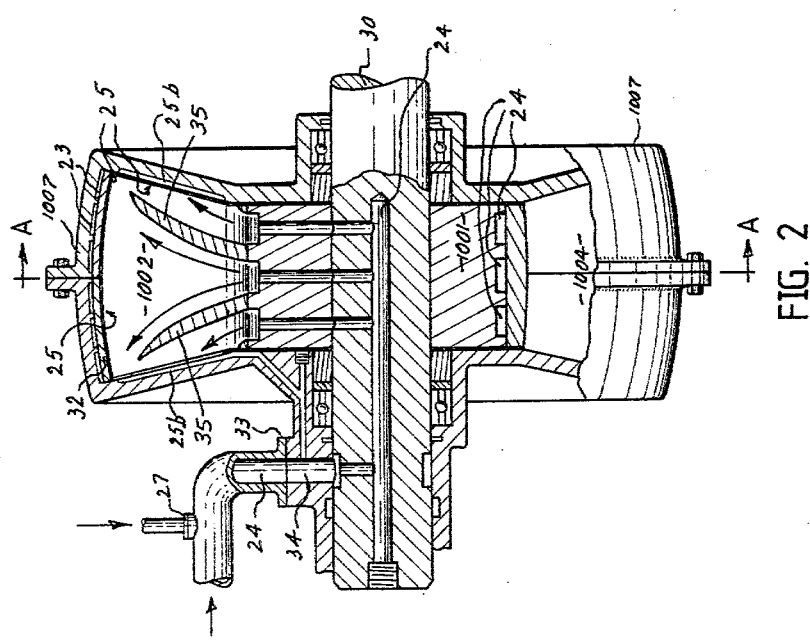
FIG. 2

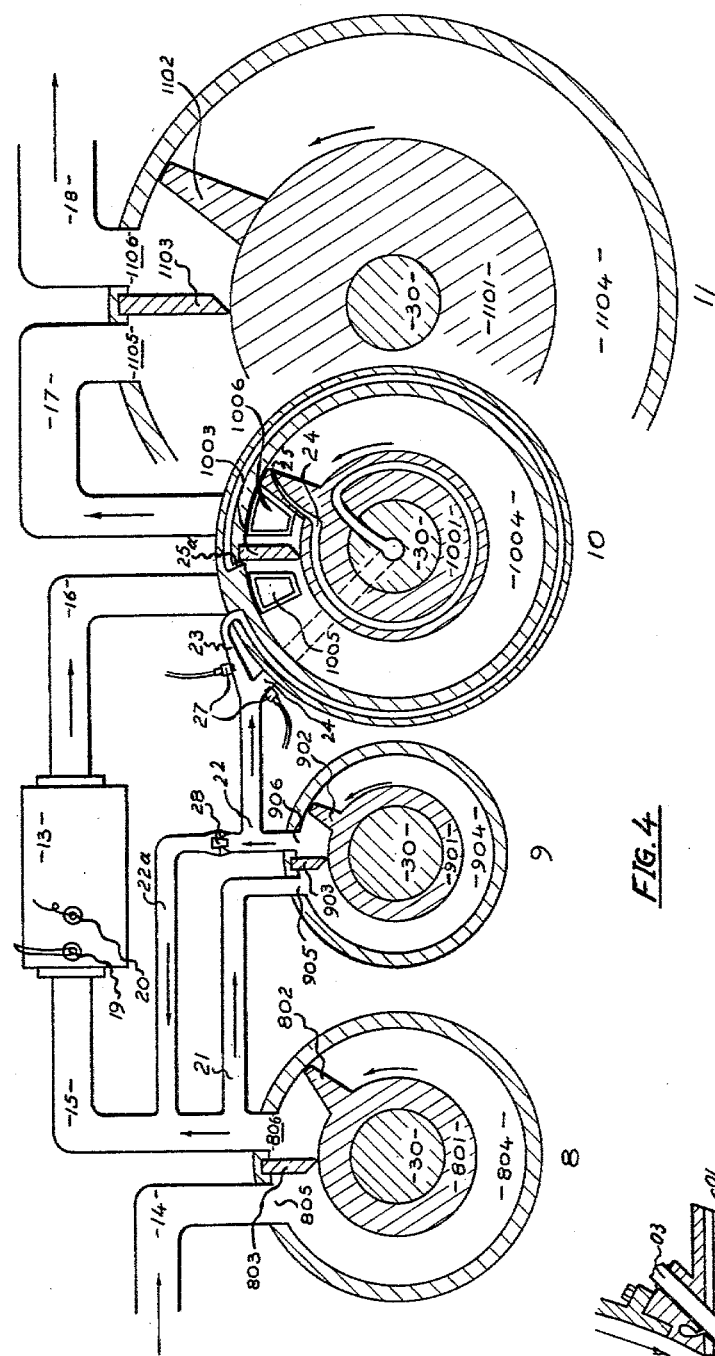
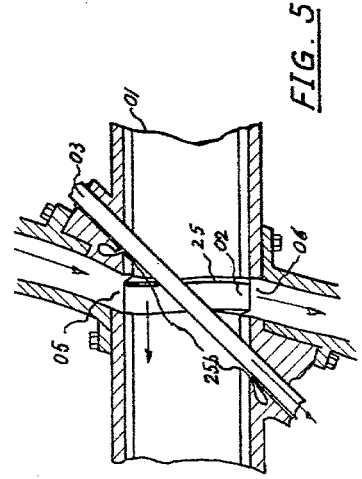
FIG. 4
FIG. 5

SPLIT CYCLE HEAT ENGINES

BACKGROUND OF THE INVENTION.

This invention relates to improvements in heat engines and turbines. In particular to engines of the rotary or turbine type, operating on a split cycle. The term "split cycle" is used here to denote heat engines in which the various stages of the thermo-dynamic process or cycle to which the working fluid is subjected, are effected in separate chambers, usually compression, combustion and expansion chambers.

Usually in these engines the compression of the air or working fluid does not present any undue problems. But the motor or turbine unit, which contains the expansion chamber, can suffer damage from overheating.

Such heat damage can especially occur where even the slightest clearance is present between the working parts, or working parts and workroom or housing, when hot gases under pressure are to be retained within a certain area. These hot gases can then leak out through such clearances and their heat together with the resultant friction on leaking out through restricted clearances, is such that adjacent areas are seriously damaged.

Other areas, by virtue of the fact that they are in contact with the hot combustion gases, may tend to overheat, and thereby suffer damage.

In the familiar piston engine these problems are overcome by sealing such clearances as may exist, for example between piston and cylinder with piston rings, i.e. seals of sliding contact, thus preventing compressed gases from leaking out of the workchamber.

Areas which may tend to overheat are cooled by a cooling medium, usually air or water and the energy absorbed by this medium is then dissipated to atmosphere. This energy is therefore irretrivably lost.

In the now also familiar gas turbine where sealing with seals of sliding contact is not possible, or practical, it is customary to provide pressurised air of lower temperature to the endangered areas thereby separating the endangered parts from the hot combustion gases. This cooler air is drawn off from the compressor after compression and channeled to the endangered areas. This effect is then often combined with labyrinth seals.

Our present gas turbines are of axial flow or centrifugal flow, and under such non-positive displacement conditions the above method of air-cooling or air sealing does not usually present any problems.

However in more recently invented engines, for example where the motor or turbine unit is of the positive displacement type turbine, such as in Australian Invention No. 487,536, such cooling and sealing is mostly not practical. The motor workroom pressures here are often of considerably higher value than the compressor out-put pressure.

In one of my inventions subsequent to Australian Invention No. 487,536 the engine referred to in the specifications relating thereto can operate in such a fashion that the compressed air from the compressor is transferred to the combustion chamber or burner area by means of a rotary positive dispacement device. In the combustion chamber the pressure of the working fluid is permitted to rise as heat is added by means of combustion of fuel. Because the expansion of the working fluid is to a certain extent restricted during the combustion process the pressure in this area will rise and can be of considerably higher value than the compressor output pressure.

In this case then the pressure of any air drawn off from the compressor output would be insufficient to overcome the pressure of the combustion chamber or of that area.

The hotter gases being of a higher pressure than the cooler gases, would simply displace the cooling air so that effective cooling could not take place.

Sealing means as used in the conventional piston engine are not practical here because of the fast rotational working speed on one hand, and on the other because of the interrelationship of the working parts, especially of interceptor and vane.

SUMMARY OF THE INVENTION

It is the object of this invention to overcome these disadvantages to a substantial degree by proposing a new method of sealing the combustion area or workchamber and cooling the relative parts or areas.

According to the invention the heat energy absorbed in the cooling process may then be converted at least in part to mechanical energy. This will increase the thermal efficiency of the engine.

To this effect a pressure booster pump is provided and coupled to the engine or its shaft. The booster being able to admit air from the compressor or from an area where high pressure occurs in the working fluid before the addition of heat. The booster then boosts the pressure of the so received working fluid, usually air, to a higher value than the pressure in the workroom to be sealed.

Suitable galleries or passages are provided in the working parts and housing in the areas where cooling needs to be effected, and these galleries receive the air flow from the booster, and connect to suitable outlets which lead into the workroom.

These outlets are preferably such that they give the best possible direction of flow into the workchamber or workroom, and also the best possible volume of flow in relation to the volume of flow delivered from the booster.

Thus these outlets, or outflow nozzles must be calibrated and preferably arranged so that the issuing flow is directed across any potential leak path along which working fluid from the workroom might tend to leak out of the workroom.

The nozzles are preferably shaped so as to allow the issuing fluid to flow across the whole width of the clearances which usually constitute the potential leak paths.

This system of galleries or passages and the flow therein is preferably provided with water injection through injectors to enhance the cooling effect of the air flow which then may also contain steam, as the water so injected will evaporate and on doing so will absorb heat from the area around the flow.

Other gases might be used to achieve improved cooling. The heat energy so absorbed in the cooling process will tend to raise the pressure and velocity of the cooling medium, this energy combining with the pressure from the booster, so that there is an effective and positive flow into the work chamber which prevents the hot combustion gases from leaking out through the so protected clearances.

The cooling and sealing medium then mixes with the working fluid and can produce useful work again on expansion in the work chamber or expansion chamber, thus recycling the energy absorbed in the cooling process.

Preferably the supply conduit to the booster pump is connected to the combustion chamber inlet or inlet conduit, so that any fluctuations in pressure in the combustion chamber are communicated to the booster work chamber.

Preferably a return conduit is provided for return of excess booster output, and connected to combustion chamber inlet or inlet conduit. The return conduit can then be provided with a suitable pressure return valve.

Advantageously this new method of sealing and cooling the work chamber, housing and working parts applies to split cycle combustion or heat engines of positive displacement; particularly where the combustion area is bounded by a positive displacement transfer arrangement, and where the motor or turbine unit can abtly be called a positive displacement turbine.

In one of its preferred forms the invention resides in an engine, comprising: compressor unit, first transfer unit, combustion chamber, second transfer unit, and motor or turbine unit.

In these engines the displacement is positive and achieved by the rotating action and interrelationship of the working parts, comprising: shaft, rotor fixed to said shaft, at least one vane fixed to said rotor and arranged so as to sweep out a circular work chamber upon rotation of said rotor an d shaft, an annular interceptor to provide an abutment wall rotating through the circular work chamber at one point at an angle, said interceptor provided with an opening on its inner periphery for passage therethrough of said vane on rotation.

Working parts and work chamber are enclosed in a housing, each unit having a separate housing, provided with inlet and outlet ports for admission and exhaust of working fluid such ports preferably positioned on opposite sides of, but close to said interceptor where it tranverses the work chamber.

The system of galleries extends through the working parts and through the housing walls where required, and one or more units of the engine can be so cooled and the working fluid can be so prevented from leaking out of the work chamber through working clearances.

So that the invention may be better understood a preferred embodiment is described hereinafter with reference to the accompanying drawings.

BRIEF DESCRIPTION OF THE DRAWINGS

FIG. 1 is a cross-sectional view along A—A of FIG. 2, showing a single vane positive displacement rotary device such as that referred to in Australian Specification No. 487,536, but here embodying the improvements.

FIG. 2 is a side elevation of the same unit with a section cut away generally along B—B of FIG. 1.

FIG. 3 is a detailed fragmentary view of portion of vane and housing showing part of the improvements.

FIG. 4 is a schematic diagram illustrating the working method of the invention.

FIG. 5 is a sectional plan view of inlet and outlet arrangement of a rotary device embodying some improvements.

DETAILED DESCRIPTION

The various units of split cycle engines such as the one referred to in the specification an in the following pages are often mounted on a common shaft. In this way their rotors rotate in unison and the gas or working fluid connections from one unit to the next extend substantially parallel to the shaft's direction. However for ease of illustration FIG. 4 shows diagrammatic cross-sectional views of each unit disposed side by side as if mounted on separate shafts.

Normally the inlet and outlet port of each rotary device in this type of engine are on opposite sides of the work chamber, as shown in FIG. 5. However again for ease of illustration FIG. 4 shows diagrammatic side by side arrangement of inlet and outlet with the interceptor providing the separation.

Typically an engine of split cycle comprises a compressor, a combustion chamber or heat exchanger and a motor or turbine unit.

In the illustrated engine as shown in FIG. 4 the compressor has been omitted from the drawing. The combustion area is bounded by two transfer units 8 and 10. The first transfer unit 8 receives compressed air from the compressor, (not shown) and transfers it to the combustion chamber 13.

The second transfer unit 10 receives the combustion gases from the combustion chamber 13 and transfers them to the motor or turbine unit 11.

The features of this engine are described in more detail in Australian Patent Application No. 37173/78, and in U.S. patent application Ser. No. 916,021, dated June 15th, 1978 now abandoned.

One of the advantages of this engine is that the gas pressures in the combustion chamber, and in the conduits leading thereto and therefrom may rise to considerably higher pressure than the compressor output pressure.

For that reason the air feed to the booster pump 9 is drawn off from the pipe 15, which is the inlet pipe to the combustion chamber.

In cases where this transfer method is not used the air to feed the booster may be drawn off from the compressor outlet area.

In this preferred embodiment of the invention the booster pump 9 is of the same type and structure as the other units which form part of this engine. The features of such units are outlined in detail in the original invention specification: Australian Invention No. 487,536. For descriptive convenience in the following description the various components of the first transfer unit 8, the booster pump 9, the second transfer unit 10, and the motor unit 11, which correspond in function are correspondingly numbered in FIG. 4, but with their numbers preceeded by the number 8, 9, 10, or 11 respectively to correspond with the four units so numbered.

Accordingly referring to FIG. 4 it will be found that the combustion chamber 13 has an inlet pipe, or inlet conduit 15, and an outlet conduit 16, each connected to a rotary device. The rotary device 8 is the first transfer unit, which receives compressed air from the compressor, (not shown) through conduit 14, into work chamber 804, behind the vane 802.

At one point between inlet 805 and outlet 806 the interceptor 803 rotates through the work chamber 804 at an angle, as can be better seen from FIG. 5. The interceptor is so positioned in the housing that its inner periphery is kept in contact with the outer periphery of the rotor 801, or practically so, and this has a certain sealing effect, so that gas leakage from one side of the interceptor to the other thereof is minimal, especially where a fast rotational speed prevails as in this type of engine.

The vane therefor compresses any gas in front of it—that is to say in front of the vane—against the side of the interceptor and pushes it out through the outlet 806 into the conduit 15 and combustion chamber 13.

As the vane 802 crosses the path of rotation of the interceptor 803 it engages in an opening provided in the interceptors inner periphery, so that on further rotation the vane glides through this opening.

On the other side of the interceptor the gases previously pumped into the work chamber 804 are now in front of the vane 802. and on further rotation are pumped out to the combustion chamber 13 through conduit 15, via outlet 806. So that the vane registers acurately with the opening in the interceptor on rotation the two members are synchronised in their movements, preferably by matching gear teeth formations on the rotor's outer periphery and on the interceptor's inner periphery.

The second transfer unit 10 operates in a similar fashion, except that it receives the combustion gases from the combustion chamber through conduit 16 and moves them out through conduit 17 into the work chamber 1104 of the motor or turbine unit 11. The larger volume of the work chamber 1104 permits the gases to expand and working pressure is exerted on the vane 1102, before the gases exhaust through outlet 1106 into exhaust 18, and to atmosphere.

Due to the positive displacement action of these rotary devices the pressure in the combustion chamber 13, and also in the transfer conduits 15, and 16, can rise substantially with the addition of heat to the working fluid in the combustion chamber, depending on the size of the second transfer unit 10 in relation to the first transfer unit 8.

Such is the operation of this type of engine, as decribed in detail in the aforementioned Patent Applications and specifications.

The following details constitute the improvements:

The inlet 905 of booster unit 9 is connected by a feed conduit 21 to pipe 15. This means that any pressure fluctuations in the combustion chamber 13 are communicated through pipe 15 and feed conduit 21 to the work chamber 904 of the booster pump 9. (See FIG. 4)

The booster pump then boosts the pressure of the fluid received, usually air, and pumps it out through outlet 906 and conduit 22 into the system of galleries or passages 23 and 24. These galleries lead to suitable outflow nozzles 25, 25a, and 25b, which are calibrated and shaped so that the best possible flow is achieved.

FIG. 3 gives details of the position of the nozzle 25 at the tip of vane 1002 of unit 10, as well as direction of flow of the sealing medium, i.e. at an angle to the work chamber wall, and towards the compressed gases to be contained.

FIG. 2 shows details of galleries 23 and 24 provided in the walls of the housing 1007, and inside the working parts respectively of unit 10. For ease of manufacture the housing is suitably sleeved with the sleeve 32 covering the galleries 23 in the housing 1007.

The common shaft 30 can be in sections, which can be bolted together. The section pertaining to the unit in need of sealing and cooling, is drilled or hollow for continuation of gallery 24 from outside the unit 10 to its working parts via flange 33 and passage 34 in housing 1007.

From the hollow shaft gallery 24 divides into three parallel galleries for better cooling of rotor 1001 and vane 1002. As shown in FIG. 1 these galleries are provided circumferentially under the outer sleeve of the rotor 1001.

The rotor 1001 is made in two sections for ease of manufacture of the galleries provided therein, the outer sleeve being press-fitted over the inner core after finishing operations.

The vane itself can be made substantially hollow if this is preferred in manufacture, but should be provided with a web 35 for increased strength against the pressure of the gases within. This will facilitate manufacture of the nozzle 25, although satisfactory results can be achieved by investment casting.

The nozzles 25 amount to a thin slot in the outer surface areas, so that the issuing sealing jet is spread over the whole width of the potential leak path, as the arrows on the vane 1002 of FIG. 2 indicate.

The working clearances in this type of rotary device can be kept down to a minimum, and the rotational speed of the vane is high so that in any case the potential for leakage is small. If due to high pressure in the work chamber and low velocity of the issuing sealing jet, the clearance between the housing sleeve 32 and vane 1002 permits some gases to escape through this clearance, it will be part of the sealing jet, since this is positioned between the potential leak area and the combustion gases in the work chamber, always bearing in mind that the sealing jet is of higher pressure and must therefor displace the hot combustion gases which are of lower pressure.

The temperature of the sealing jet can be kept low enough to prevent any damage to the surfaces it may contact.

The nozzles of galleries 23 in the housing operate in a similar manner, except that the flow is from the housing galleries and is directed against a working part, in this case the interceptor 1003, against which the flow from the nozzle 25a is directed.

The flow from the nozzles 25b is similar, and although in the drawing of FIG. 2 this nozzle is connected by a gallery to passage 34, it can also be connected to suitable galleries which can be provided in the housing walls, for example in the side walls.

The flow from nozzles 25b can also be directed partly to the clearance between interceptor and rotor if this should be desirable. Alternatively suitable galleries and nozzles could even be provided in the interceptor, with the nozzles issuing on the pressure side of the interceptor, so that any issuing jet would cover and seal the interceptor/rotor contact line.

In the drawing of FIG. 4 only unit 10 is shown with this system of galleries and nozzles. However, any unit of the engine could feature this system if this is desirable. This is especially so in the case of the motor or turbine unit, 11.

In the engine according to FIG. 4, the booster pump 9 comprises similar working parts to unit 8, as described hereinbefor. However the work chamber is calibrated so that it provides the most optimum volume of flow in relation to the nozzle area where the flow issues.

The booster pump 9 is also mounted on the common shaft as indeed all the units of this engine; but can nevertheless be coupled to the engine or its shaft in any suitable manner.

The booster pump can also be of any suitable construction, and of positive or non-positive displacement.

Refering back to the booster outlet 906 it can be seen that the booster pressure delivery pipe 22 is connected to a pressure return conduit 22a. This features also a pressure return valve 28, which opens when sealing and cooling air pressure in the galleries builds up too high. Any excess pressure, or sealing air then flows back to conduit 15, via valve 28 and conduit 22a.

In this way the pressure in the gallery system is steadily maintained at a higher value than combustion chamber pressure, and work chamber 1004 pressure.

In order to lower the temperature of the sealing and cooling air flow in the system of galleries 23 and 24, these galleries are provided with water, or other coolant, injectors 27, which can inject water under pressure into these galleries.

Such injection can even be provided as far as permissible under any given circumstances to supply conduit 21. On injection the water forms a spray and mixes with the air in the galleries. The heat of the pressurised air and of the surrounding metal will cause the water to evaporate. On evaporating the water, or the forming steam will absorb heat from the surroundings, and from the air flow, thus enhancing the cooling potential of the air flow, which by then is constituted of air, water spray and steam.

The water in the stream or flow may be, or may not be totally evaporated by the time the flow issues from the nozzles into the work chamber 1004.

The evaporation of the water into steam will tend to provide the cooling and sealing flow or jet, with higher pressure and greater volume. This can have two effects, depending on the structure of the galleries and of the return valve 28.

1. The flow in the galleries will tend to speed up and to that effect the galleries and nozzles should be shaped so as to facilitate the flow and reduce drag or resistance wherever possible.

2. The higher pressure will cause the return valve 28 to open further and more air will be returned to combustion chamber inlet conduit 15, via conduit 22a.

In effect this means that the heat energy absorbed in the cooling process has been converted into pressure energy, which increases the pressure in the work chamber 1004, and also the pressure in the combustion area and combustion chamber, 13, thus giving the working fluid a greater work potential.

The energy absorbed in the cooling process is thus effectively recycled, and the thermal efficiency of the engine is increased.

In the second transfer unit 10, as shown in FIG. 4, the cooling and sealing is especially important since the pressure from the combustion chamber and combustion area is exerted in its full force through conduit 16 and inlet 1005 on the vane 1002. This pressure, although it may fluctuate to a certain extent, is relatively constant.

The temperature too is relatively constant in that area since the combustion chamber 13 is of the constant combustion type, being fueled by fuel injector 19, and ignition- or glow plug 20.

Therefor a substantial amount of heat has to be dissipated from the areas subjected to the heat effects, and for that reason the amount of heat energy recirculated by the method outlined hereinbefore can be considerable.

In the motor or turbine unit 11 the same method and system can be applied, to cool the unit and to seal the work chamber.

Indeed this method can be applied to any unit of the engine. Even the combustion chamber can be provided with a system of galleries for cooling purposes and the resultant steam and air mixture, or gases can be channeled into the work chamber of one of the units in the manner described hereinbefore.

I claim:

1. A split cycle positive displacement combustion engine system including a plurality of units and a common drive means connected to said units, each of said units being formed of a plurality of relatively movable components with clearances therebetween, said system comprising:
   a combustion chamber having an inlet and an outlet, said outlet being connected to one of said units,
   a feed pipe for carrying compressed gases to said combustion chamber,
   a booster pump connected to said common drive means, said booster pump having an inlet which is in communication with the inlet of said combustion chamber, so that any pressure changes in the combustion chamber are communicated to the booster pump inlet, said booster pump having an outlet and means for increasing the pressure of gases therein to release gases at a pressure which is higher than the pressure in said combustion chamber,
   passage means leading from said booster pump outlet to and through the components which form a said unit downstream of said combustion chamber, said passage means including an outlet nozzle directed at at least one of said clearances, said nozzles being shaped to emit a sealing flow across the width of said clearance and in opposition to any potential leakage flow through the clearance.

2. The apparatus of claim 1 including means for injecting water into the passage means to enhance the cooling effect of the gases from the booster pump.

3. The apparatus of claim 1 including a return conduit communicating between the booster pump outlet and the combustion chamber inlet, an adjustable pressure return valve in said return conduit to maintain a higher pressure at the booster pump outlet than at the combustion chamber inlet.

4. The apparatus of any one of claims 1, 2 or 3 where a said unit includes a housing providing a circular working chamber, a shaft, a rotor, at least one vane fixed to said rotor, said vane being movable through said working chamber upon rotation of said shaft and rotor, an annular interceptor to provide an abutment wall rotating through said working chamber at an angle, said interceptor having an inner periphery which has an opening to permit the passage therethrough of said vane on rotation, said housing having inlet and outlet ports on opposite sides of and close to said interceptor.

5. An apparatus as claimed in any one of claims 1, 2 or 3 wherein said booster pump is mounted on a common shaft with the other units of the system, said booster pump and said units each including a housing providing a circular working chamber, a shaft, a rotor, at least one vane fixed to said rotor, said vane being movable through said working chamber upon rotation of said shaft and rotor, an annular interceptor to provide an abutment wall rorating through said working chamber at an angle, said interceptor having an inner periphery which has an opening to permit passage therethrough of said vane on rotation, said housing having inlet and outlet ports on opposite sides of and close to said interceptor.

6. An apparatus as claimed in any one of claims 1, 2 or 3 where said system includes a compressor, a first said unit having an inlet connected to the compressor and an outlet connected to the combustion chamber, a second said unit which is a motor/turbine unit, and a said unit which is a transfer unit having an inlet connected to the combustion chamber and an outlet connected to the motor/turbine unit.

7. An apparatus as claimed in claim 4 wherein the rotor is formed of an inner core and an outer sleeve, said outer sleeve including the vane to simplify the manufacture of the passages in said rotor and vane.

* * * * *